United States Patent
Astle

[11] Patent Number: 5,818,969
[45] Date of Patent: Oct. 6, 1998

[54] INTELLIGENT START FOR MOTION ESTIMATION SEARCH

[75] Inventor: Brian Astle, Phoenix, Ariz.

[73] Assignee: Intel Corporation, Santa Clara, Calif.

[21] Appl. No.: 854,770

[22] Filed: May 12, 1997

Related U.S. Application Data

[63] Continuation of Ser. No. 439,755, May 12, 1995, abandoned.

[51] Int. Cl.[6] .............................. G06K 9/36; H04N 7/12
[52] U.S. Cl. ...................... 382/236; 382/232; 348/407; 348/416; 348/699
[58] Field of Search ..................... 382/232, 236, 382/107; 348/402, 413, 416, 420, 699, 407

[56] References Cited

U.S. PATENT DOCUMENTS

| | | | |
|---|---|---|---|
| 4,849,810 | 7/1989 | Ericsson | 358/133 |
| 5,019,901 | 5/1991 | Uomori et al. | 348/699 |
| 5,126,841 | 6/1992 | Tanaka et al. | 348/415 |
| 5,150,209 | 9/1992 | Baker | 358/133 |
| 5,151,784 | 9/1992 | Lavagetto et al. | 348/416 |
| 5,173,773 | 12/1992 | Ueda et al. | 348/407 |
| 5,198,901 | 3/1993 | Lynch | 348/413 |
| 5,200,820 | 4/1993 | Gharavi | 348/699 |
| 5,210,605 | 5/1993 | Zaccarin | 348/416 |
| 5,251,028 | 10/1993 | Iu | 348/400 |
| 5,329,318 | 7/1994 | Keith | 348/699 |
| 5,398,068 | 3/1995 | Liu | 348/416 |
| 5,428,403 | 6/1995 | Andrew | 348/402 |
| 5,436,666 | 7/1995 | Astle | 348/416 |
| 5,442,409 | 8/1995 | Morgan | 348/699 |

OTHER PUBLICATIONS

Hsieh, Motion Estimation Using Interblock Correlation, IEEE, 1990, pp. 995–998.

*Primary Examiner*—Leo H. Boudreau
*Assistant Examiner*—Matthew C. Bella
*Attorney, Agent, or Firm*—William H. Murray, Esq.; N. Stephan Kinsella, Esq.

[57] ABSTRACT

An intelligent start for a block-matching search is employed. Motion vectors which have been calculated for immediately adjacent blocks in the same image and for corresponding blocks in previous images are used. If the region upon which motion estimation is being performed is uniform and there is no disturbance motion estimation may be very fast. If there are many discontinuities, for example edges, then a more extensive search is required. To do this, possible candidate vectors are searched and a comparison measure is obtained for each. From these the best match is determined. A local fine search is then performed. The best motion vector can usually be found by examining only a few well-chosen candidate vectors. This greatly improves the efficiency of the search.

20 Claims, 7 Drawing Sheets

| $V_{X1}$ | $V_{X2}$ | $V_{X3}$ | $V_{X4}$ | $V_{X5}$ | $V_{X6}$ | $V_{X7}$ | $V_{X8}$ | $V_{X9}$ | $V_{X10}$ |
|---|---|---|---|---|---|---|---|---|---|
| $V_{X11}$ | $V_{X12}$ | $V_{X13}$ | $V_{X14}$ | $V_{X15}$ | $V_{X16}$ | $V_{X17}$ | $V_{X18}$ | $V_{X19}$ | $V_{X20}$ |
| $V_{X21}$ | $V_{X22}$ | $V_{X23}$ | $V_{X24}$ | $V_{X25}$ | $V_{X26}$ | $V_{X27}$ | $V_{X28}$ | $V_{X29}$ | $V_{X30}$ |
| $V_{X31}$ | $V_{X32}$ | $V_{X33}$ | $V_{X34}$ | $V_{X35}$ | $V_{X36}$ | $V_{X37}$ | $V_{X38}$ | $V_{X39}$ | $V_{X40}$ |
| $V_{X41}$ | $V_{X42}$ | $V_{X43}$ | $V_{X44}$ | $V_{X45}$ | $V_{X46}$ | $V_{X47}$ | $V_{X48}$ | $V_{X49}$ | $V_{X50}$ |
| $V_{X51}$ | $V_{X52}$ | $V_{X53}$ | $V_{X54}$ | $V_{X55}$ | $V_{X56}$ | $V_{X57}$ | $V_{X58}$ | $V_{X59}$ | $V_{X60}$ |
| $V_{X61}$ | $V_{X62}$ | $V_{X63}$ | $V_{X64}$ | $V_{X65}$ | $V_{X66}$ | $V_{X67}$ | $V_{X68}$ | $V_{X69}$ | $V_{X70}$ |
| $V_{X71}$ | $V_{X72}$ | $V_{X73}$ | $V_{X74}$ | $V_{X75}$ | $V_{X76}$ | $V_{X77}$ | $V_{X78}$ | $V_{X79}$ | $V_{X80}$ |

FIG. 7

| $V_{Y1}$ | $V_{Y2}$ | $V_{Y3}$ | $V_{Y4}$ | $V_{Y5}$ | $V_{Y6}$ | $V_{Y7}$ | $V_{Y8}$ | $V_{Y9}$ | $V_{Y10}$ |
|---|---|---|---|---|---|---|---|---|---|
| $V_{Y11}$ | $V_{Y12}$ | $V_{Y13}$ | $V_{Y14}$ | $V_{Y15}$ | $V_{Y16}$ | $V_{Y17}$ | $V_{Y18}$ | $V_{Y19}$ | $V_{Y20}$ |
| $V_{Y21}$ | $V_{Y22}$ | $V_{Y23}$ | $V_{Y24}$ | $V_{Y25}$ | $V_{Y26}$ | $V_{Y27}$ | $V_{Y28}$ | $V_{Y29}$ | $V_{Y30}$ |
| $V_{Y31}$ | $V_{Y32}$ | $V_{Y33}$ | | | | | | | |
| | | | | | | | | | |
| | | | | | | | | | |
| | | | | | | | | | |
| | | | | | | | | | |

FIG. 8

| | | 42 | | 27 | | 44 | | |
|---|---|---|---|---|---|---|---|---|
| | 46 | 63 | 25 | 51 | 23 | 61 | 47 | |
| 40 | 58 | 16 | 35 | 11 | 33 | 13 | 59 | 37 |
| 56 | 20 | 32 | 8 | 3 | 5 | 29 | 17 | 53 |
| 22 | 50 | 10 | 2 | 0 | 1 | 9 | 49 | 21 |
| 54 | 18 | 30 | 6 | 4 | 7 | 31 | 19 | 55 |
| 38 | 60 | 14 | 34 | 12 | 36 | 15 | 57 | 39 |
| | 48 | 62 | 24 | 52 | 26 | 64 | 45 | |
| | | 43 | | 28 | | 41 | | |

INTELLIGENT START FOR MOTION ESTIMATION SEARCH

This application is a continuation of application Ser. No. 08/439,755, filed on May 12, 1995, which is now abandoned.

BACKGROUND OF THE INVENTION

1. Field of the Invention

The present invention relates to signal processing and, in particular, to computer-implemented processes and apparatus for efficient block comparisons in motion estimation systems for video compression and coding.

2. Description of the Related Art

Motion estimation is commonly utilized by video encoders in signal processing techniques that compress successive frames of digital video data ("video frames"). When these video frames are to be transmitted via a communication medium of limited bandwidth, or are to be stored in a storage medium having limited storage capacity, it is often desirable to first compress the digital data which represents each frame, so as to reduce the amount of data that needs to be transmitted.

Motion estimation is one of the most computationally intense of the various techniques utilized to compress data. Motion estimation techniques exploit the temporal correlation that often exists between consecutive video frames, in which there is a tendency for objects or image features to move from one location to another on a display device from frame to frame.

For instance, frame 1 may contain an object, and frame 2 may contain a set of pixels corresponding to the same object spatially displaced from the location in frame 1. If frame 1 is transmitted to and received by a pixel processor or video processor (which performs any necessary decompression or other decoding), frame 2 may be transmitted without including the pixel data corresponding to the object. Instead, motion vectors (i.e. "pointers") are sent along with frame 2 (which may also be compressed using other techniques). These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in frame 2.

The motion estimation procedure may be performed at the encoder level by comparing given regions or blocks within a current video frame to many regions or blocks within the previous video frame. The process of comparing a given block of one frame to a block of another frame is called "block matching." Blocks are matched by determining a "comparison measurement" between any given pair of blocks. A comparison measurement corresponds to some form of indication of a degree of "difference" between the two regions. If the comparison measurement is below a predetermined threshold, the blocks may be considered to be similar enough that a block match is indicated. If so, the block in the previous video frame may be utilized as described above by the video decoder to reproduce a duplicate block in the current video frame.

In performing such comparisons, a number of pixels from the previous video frame are accessed for each block of the current video frame that is subjected to motion estimation. In most general-purpose video processing systems, the bit maps corresponding to the previous and current video frame pixels are stored in general purpose memory connected to the video processor through a bus. For each block matching procedure the video processor must access the memory many times, which may constitute a high amount of traffic on the bus and a high number of memory accesses. Because of the limited bandwidth of the bus by which the memory is accessed, these memory accesses can tie up use of the bus and memory and thus slow down overall operation of the video processing system.

To avoid this problem, the video processor performing the motion estimation step may contain, for example, a dedicated, special-purpose memory space to store the two video frames being compared so that there is less traffic on the bus. However, such a special-purpose memory space is often unavailable, unfeasible, or otherwise not desired because of the extra complexity of such a special-purpose memory. The special-purpose memory space may be too costly. Further, even a special purpose memory space may be accessed so often during block matching that the video processor may be slowed down.

Exhaustive search examines every position in the search range. This is expensive, particularly if fractional pixel displacements are included. Other more efficient strategies benefit from a good starting position.

Normally, these may be a global position for best match, but there may be several positions for which the vectors give a "good enough" match allowing early termination of the search. There is a class of "stepping searches" which start from some position and attempt to find the best match by changing the vector systematically until an adequate match is found. Two of these are preferred by Applicant: (1) a modified form of "steepest-descent" stepping search, and (2) a "table-driven" search.

A preferred steepest descent stepping search consists of the following steps:

(1) Set the stepsize to some course value, e.g. 1 pixel;
(2) Evaluate the 8 neighboring positions with the current stepsize and find that which gives the best match;
(3) If the match is better than the stopping threshold then stop;
(4) If the match is worse than the current match then: if the stepsize is coarse then set the stepsize to fine (e.g. ½ pixel) and go to step 1, if the stepsize is fine go to step 8;
(5) Take consecutive steps with the current stepsize in the direction of the best match found in step 2 until the block match error increases, and then set the current position to the best match found;
(6) If the match is better than the stopping threshold then stop;
(7) Go to step 1;
(8) Here a local minimum has been found which does not satisfy the stopping criteria; if time permits examine motion vectors at ever increasing distance looking for a match better than the current one, if such a match is found go to step 1; if time runs out, report a mismatch.

The well-known table driven search technique is typically somewhat less efficient than the previously-described steepest descent search, but is more suitable for parallel processing.

Those skilled in the art may devise other search strategies. But for all efficient search strategies a good starting position will result in a faster path to the final optimum position.

It is accordingly an object of this invention to improve upon the techniques of the known art and to provide a method and apparatus that more efficiently uses available data to determine a preferred starting point for accurate and speedy block matching.

Further objects and advantages of this invention will become apparent from the Detailed Description of preferred embodiments which follows.

SUMMARY OF THE INVENTION

An intelligent start for a block-matching search is employed. Motion vectors which have been calculated for immediately adjacent blocks in the same image and for corresponding blocks in previous images are used. The candidate vectors are evaluated and a comparison measure is obtained for each. From these a best match is determined. A search is then performed using this as the starting position. The best motion vector can usually be found by examining only a few well-chosen candidate vectors. This technique greatly improves the efficiency of the search.

BRIEF DESCRIPTION OF THE DRAWING

These and other features, aspects, and advantages of the present invention will become more fully apparent from the following description, appended claims, and accompanying drawing, in which:

FIG. 7 shows the motion estimation vectors for an immediately previous Frame X, Sector 6.

FIG. 8 shows the motion estimation vectors for partially-completed current Frame Y, Sector 6.

DETAILED DESCRIPTION

Figure 1:
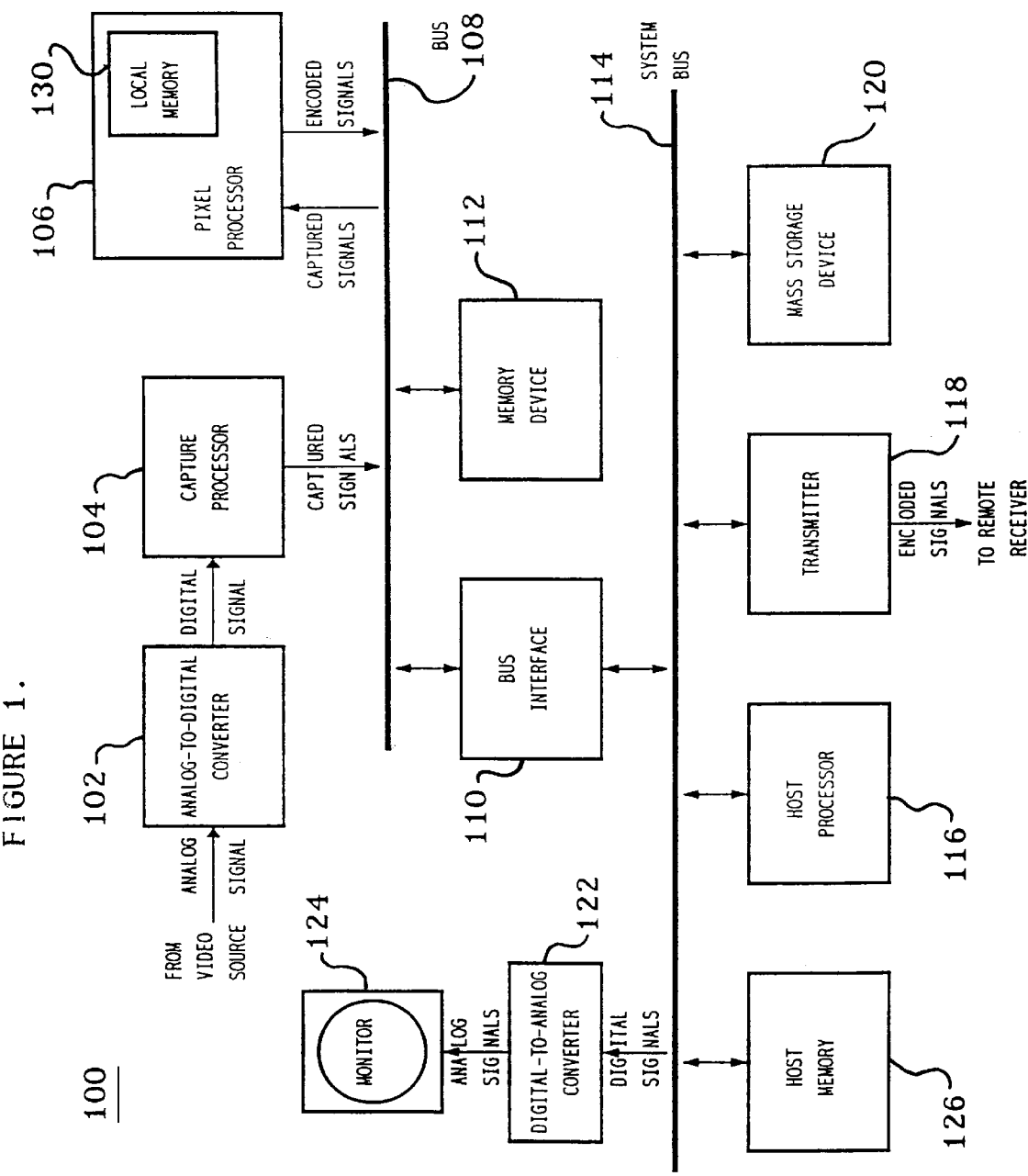
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV 2:1:1 format, in which every (2×2) block of pixels of the Y component plane corresponds to a single pixel in the U component plane and a single pixel in the V component plane. Alternatively, a YUV 4:1:1 format can be used.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
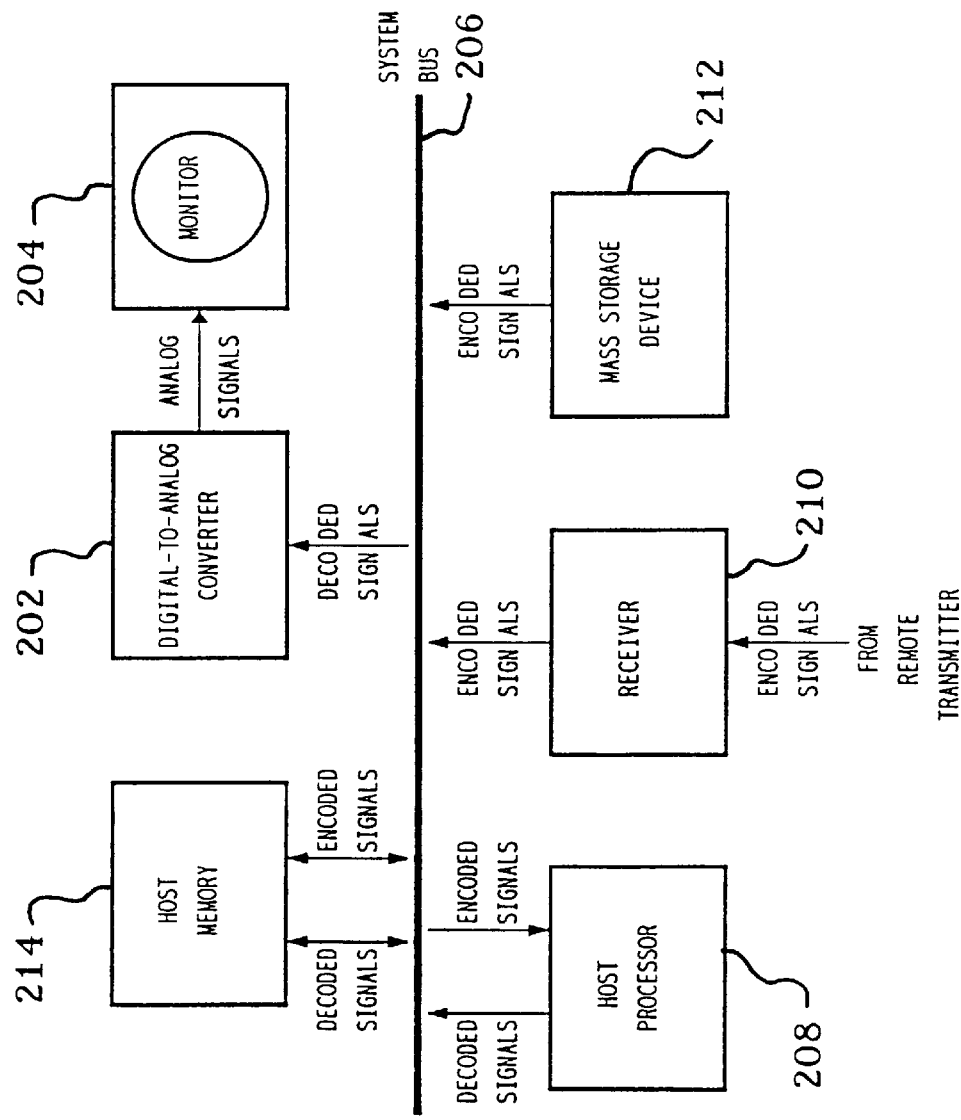
FIG. 2 is a computer-based decoding system for decoding the video signals encoded by the computer system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now again to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of other video signals.

Figure 3B:
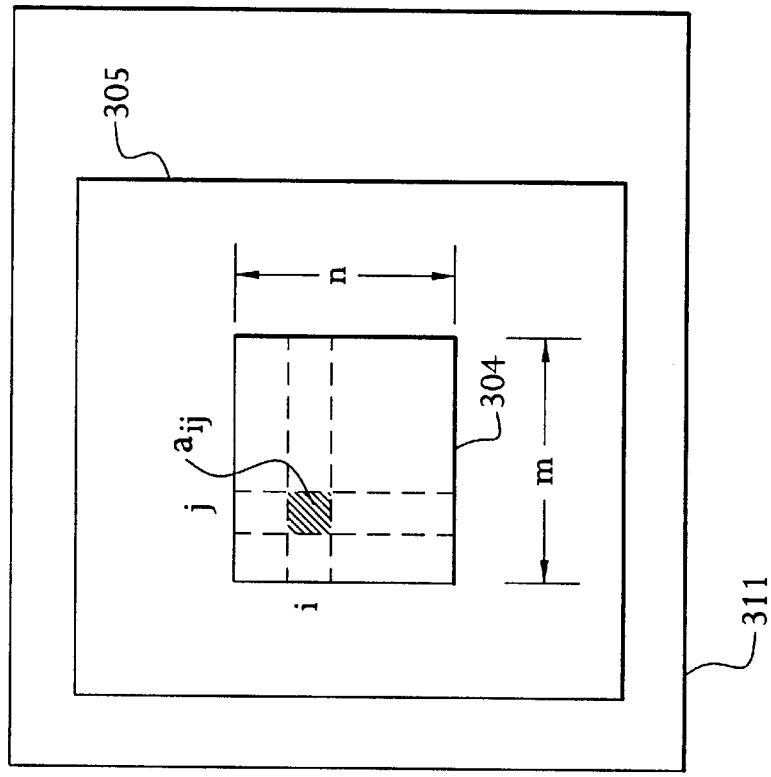
FIG. 3 depicts reference and search frames having reference and search blocks and a search area utilized in motion estimation by the computer system of FIG. 1, according to a preferred embodiment of the present invention.
Figure 3A:
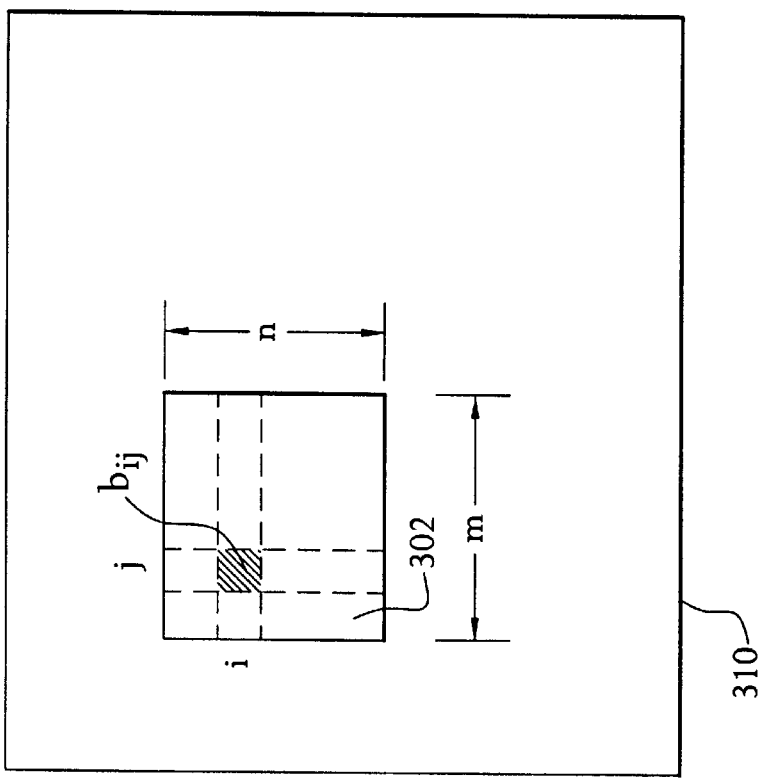

Referring now to FIG. 3, there are shown current frame 310 and search frame 311 stored in memory device 112. Current frame 310 and search frame 311 are two of the most recent video frame frames of a plurality of consecutive video frames. Current frame 310 is the current video frame being compressed, and search frame 311 is a previously-decoded video frame, preferably the immediately previously-decoded video frame, which is searched by a motion estimation procedure for block matches between search frame 311 and current frame 310. MPEG-1 standards require storage of two previously decoded frames, since "B" pictures can have motion compensation from two previously decoded frames. Current frame 310 contains reference block 302, and search frame 311 contains search block 304 and search area 305.

Reference (i.e. current) and search frames 310 and 311 may be of any pixel size, and in a preferred embodiment have a size of (240×352) pixels, i.e. 240 rows×352 columns of pixels. When performing block matching operations for motion estimation, current frame 310 is divided into a number of smaller regions or blocks such as reference block 302. Reference block 302 (as well as search blocks such as search block 304) may be of various sizes and shapes. In a preferred embodiment, reference block 302 contains an 16×16 array of pixels. In an alternative preferred embodiment of the present invention, reference block 302 contains a (8×8) block of pixels. In further alternative preferred embodiments, reference block 302 contains, in general, (n×m) pixels, where n is the number of rows and m is the number of columns.

When performing block matching for purposes of motion estimation, reference block 302 is compared with various search blocks such as search block 304 of search frame 311, and the aforementioned comparison measurement which represents an indication of a degree of variation between a reference block 302 and a given search block 304 is determined. If this comparison value is sufficiently low, e.g. below a predetermined threshold value, a match is indicated. If a match is indicated, a motion vector which indicates the location of the matching search block 304 in search frame 311 as well as the location of reference block 302 in current frame 310, may be transmitted by pixel processor 106 to remote receiver 210. It will be appreciated that other data corresponding to current frame 310 may be transmitted as well, for example data compressed with other techniques that represent other blocks within current frame 310.

Since the decoding system of FIG. 2 should already have received previously-transmitted search frame 311 containing search block 304 (where search frame 311 may have itself been compressed and then decompressed), search block 304 from search frame 311 may be used with the transmitted motion vector to reproduce reference block 302 when decompressing current frame 310. It will be understood that if a lower threshold value is utilized in block matching, it will be more difficult to find a matching block, and the motion estimation procedure may take longer, but more accurate results may be obtained. By the same token, if a higher threshold value is utilized a "match" will likely be found more quickly but potentially less accurate results might be obtained. In practice it is sometimes desirable to employ two thresholds: (1) a "stopping" threshold, which, when reached, promptly stops the search altogether; and (2) a "matching" threshold, which is typically greater than (but never less than) the stopping threshold. If the stopping threshold is never reached, then, upon completion of the search, a match is declared for the block that yields a comparison value furthest below the matching threshold. It will further be understood that if no match is found during the motion estimation process then reference block 302 might not be able to be reconstructed from a similar block from the previous search frame 311, and may therefore need to be transmitted in its entirety (for example, after being compressed by other data compression methods such a discrete cosine transform.

Given two blocks such as reference block 302 and search block 304 which are to be compared with each other to determine if there is a match, a comparison measurement is performed by encoding system 100. The basis of such comparison is often a standard calculation known as the "$L_1$ Norm" (i.e. the "absolute value of the difference" norm) which has the following form:

$$L_1 \text{ Norm} = \sum_{i=0}^{i=n} \sum_{j=0}^{j=m} |a_{ij} - b_{ij}|$$

where:

$a_{ij}$ is a value of a pixel in the ith row and jth column of search block 304;

$b_{ij}$ is a value of a pixel in the ith row and jth column of reference block 302;

n is the number of rows in a block; and m is the number of columns in a block.

It will be appreciated that the lower the difference indicated by the $L_1$ Norm calculation, the more similar are the reference and search blocks being compared. It will further be appreciated that the likelihood of finding a match increases if more search blocks are compared against reference block 302, i.e. if more comparison measurements are determined. For example, an exhaustive block matching comparison may be performed, where, for each reference block 302 within current frame 310, the $L_1$ Norm is calculated for every search block 304 within search frame 311, or at least until a "match" below a certain threshold is found. It will be understood that the search blocks within search frame 311 may be displaced from each other by only one pixel or one fractional pixel horizontally or vertically and thus may overlap many neighboring search blocks by a substantial number of pixels. With fractional pixels, typically, linear interpolation is used; however, higher order interpolation such as "cubic" or "spline" can be used. In such an exhaustive search, the first search block 304 may be chosen as the search block in the uppermost and left most corner of search frame 311, the next may be the search block one pixel displacement to the right of this block (which overlaps the previous search block to some extent), and so on until reference block 302 is exhaustively compared against each possible search block 304 within search frame 311. Once the best integer pixel position is found, then a fractional pixel search nearby can be employed to find the best match.

Because such an exhaustive motion estimation procedure may be very computationally intensive, often the block matching performed by pixel processor 106 during the motion estimation procedure is performed on only a subset of possible search blocks within search frame 311. Because oftentimes a temporal correlation occurs between successive video frames such as search frame 311 and current frame 310, it is often statistically likely that any potential matches that exist will be found within a local region surrounding the location of reference block 302, perhaps even at the same location as reference block 302. The reason for this is that image features often will not move by very many pixels, if at all, from frame to frame. Therefore, a search area such as search area 305 may be selected as a subset of search frame 311. However, it will be understood that search area 305 may be as large as search frame 311 itself. When, for example, an exhaustive block matching comparison is performed by comparing a reference block 302 to each search block 304 within search frame 311, search area 305 may be considered to be equal to the entire search frame 311. In a preferred embodiment, search area 305 is a proper subset of search frame 311 and any given search block 304 is selected from search area 305, thus yielding a smaller possible number of search blocks, and consequently a smaller number of $L_1$ Norm measurements and related determinations and computations that must be performed. Those skilled in the art will appreciate that search area 305 may be (in alternative preferred embodiments) of any generalized size (p×q), to contain a selected number of search blocks 304.

Figures 4A, 4B:
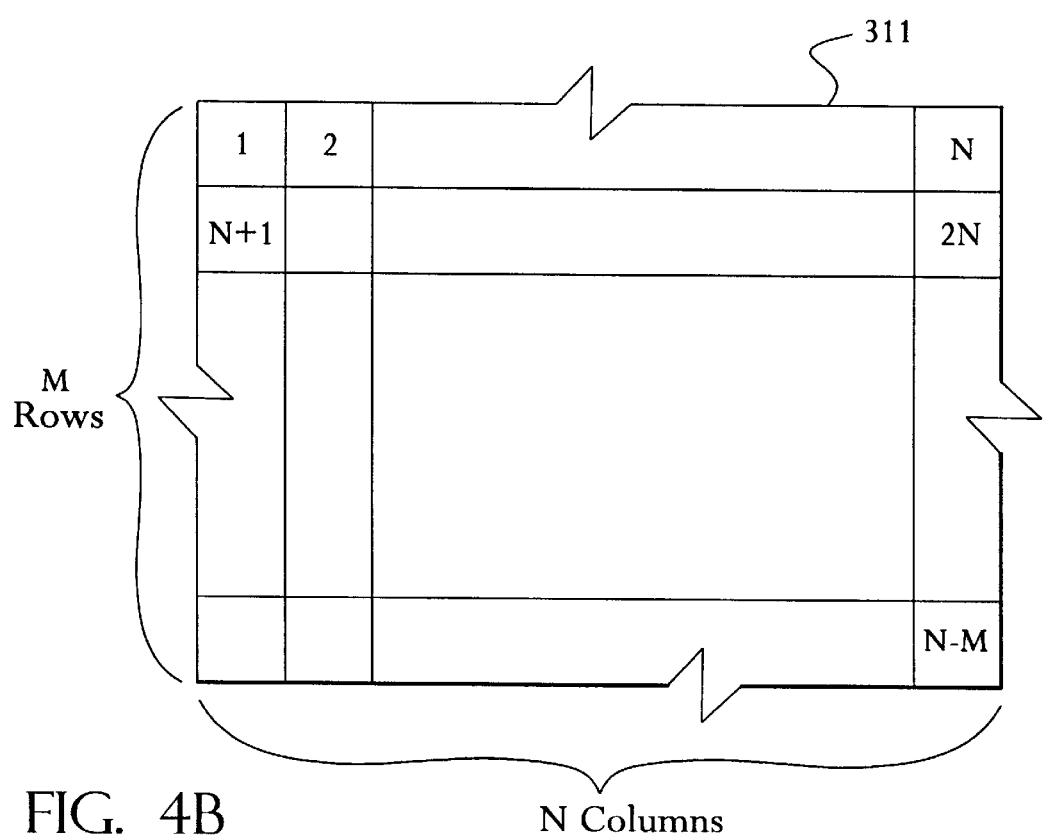
FIGS. 4A and 4B illustrate the ordering of pixels within the search block of FIG. 3, and the ordering of search blocks within the search frame of FIG. 3, respectively.

Referring now to FIGS. 4A and 4B, there is illustrated the ordering of pixels within search block 304 and the ordering of search blocks such as search block 304 within search frame 311. As shown in FIG. 4A, a given pixel i,j of an (8×8) search block 304 is located at the ith row and jth column of the block. Thus, pixel 0,0 is located in the upper left corner of search block 304 while pixel 0,7 is located in the upper right corner of search block 304. FIG. 4B shows the ordering of possible search blocks 304 within search frame 311, where there are (M×N) search blocks within search frame 311.

It will be appreciated that calculations other than the above-described "$L_1$ Norm" may be utilized to perform comparison measurements between reference and search blocks. For example, an "$L_2$ Norm" (i.e. the "square of the absolute value of the difference" norm) has the following form:

$$L_2 \text{ Norm} = \sum_{i=0}^{i=n} \sum_{j=0}^{j=m} (a_{ij} - b_{ij})^2.$$

The above-described norms ($L_1$ and $L_2$) are useful for block matching comparisons, but a great deal of computation is necessary to proceed with "brute force" block matching based thereon.

Many techniques for improving the efficiency of motion estimation are known, for example: full search, hierarchical search, logarithmic search, and stepping search, as described in the MPEG-1 standards.

Full search is inefficient. About the same performance, as judged by visual quality of the encoded sequence, can be obtained using other methods with more than an order of magnitude less computation.

Logarithmic and hierarchical searches are more efficient than full search, but they fail to take full advantage of all the known information.

An important aspect of motion estimation is block matching: calculating the motion estimation error of a proposed motion vector. Block matching is expensive for two reasons: a significant amount of computation is required, and a high pixel transfer rate is needed for the processor to access the pixels in the reference picture. It is therefore worthwhile spending some time using the information available to the estimator as a result of previous calculations, to make "educated choices".

For any block, information is available from surrounding blocks, both spatially in the same picture, and temporally in previous pictures. Under these circumstances, the best motion vector can often be quickly found by examining only a few well-chosen candidate vectors.

After a video transition, e.g. an abrupt scene change or cut, information is not available from previous pictures, but information from previous estimated blocks in the same picture provides valuable information.

Motion estimations can be based on the original source video, or on the reconstructed video. There is not much difference in final quality between them.

The advantages of using the source video as a basis for motion estimation include: (1) the motion vectors are more accurate, giving fewer motion artifacts, and allowing greater encoder flexibility; and (2) calculations can be pipelined.

There is some advantage in smoothing the motion vector field since discontinuities produce high-frequency artifacts. The source pictures tend to give the smoothest field since the vectors are not disturbed by reconstruction noise. Smooth fields require fewer bits to code since the motion vectors are dpcm coded.

Figures 5, 6:
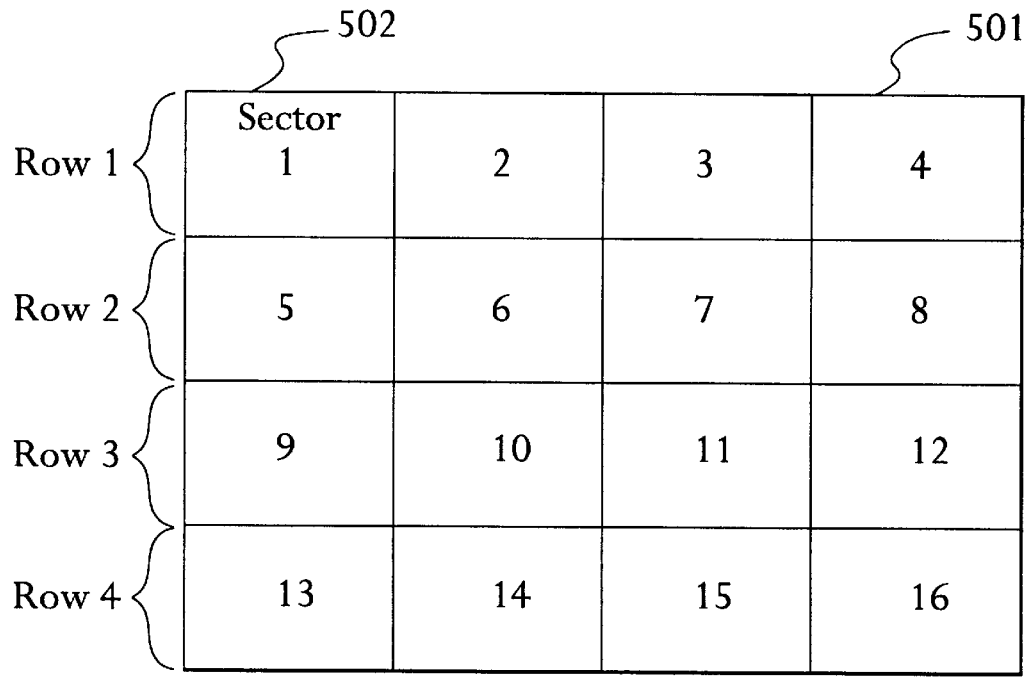
FIG. 5 shows a digital video frame divided into sixteen sectors and four rows.
FIG. 6 depicts a typical sector divided into eighty standard pixel blocks.

Referring now to FIG. 5, therein depicted is a typical video frame 501 with 16 sectors 502 and 4 rows. Frame 501 can also be characterized as having 4 quadrants: Quadrant 1 consists of Sectors 1, 2, 5, and 6; Quadrant 2 consists of Sectors 3, 4, 7, and 8; etc. This dividing up of the frame into 4 rows or 4 quadrants provides for convenient implementation of parallel processing for improved time efficiency in the processing of the large amount of video data in the frame.

For the purposes of describing the concepts of Applicant's invention, each sector 502 is considered herein to contain 80 standard 8×8 pixel blocks 304 in a 10×8 block format as shown in FIG. 6.

Consider a sequence of video frames being processed and transmitted using motion estimation compression. FIG. 8 shows Sector 6 of a current Frame Y for which motion estimation vectors, $V_y$, have already been calculated sequentially for block locations 1 through 33. Correspondingly, the motion estimation vectors, $V_x$, for Sector 6 of the immediately previously transmitted Frame X are shown in FIG. 7. Applicant has discovered that knowing these already-determined vectors for the immediately previous frame and for the previous block positions (e.g. 1–33) in the current frame is very helpful in determining quickly what the motion estimation vector should be for the next block position (i.e. 34) in Frame Y.

Candidate vectors are chosen from the previous vectors $V_x$ and $V_y$ in a systematic manner. Block comparisons are made between the video data in block position 34 of Frame Y and the various block positions in Frame X that are indicated by the respective candidate vectors. Thus, the data in Frame X to which block 34 of Frame Y is to be compared is determined by moving from the position of block 34 in Frame X by a distance and direction determined by a motion vector. Applicant's preferred candidate vectors are chosen in a prioritized sequence as follows:

(1) "Zero" Vector
 (i.e. first compare the video data for block position 34 in Frame Y with the video data for block position 34 in previous Frame X);
(2) "Left Same"
 (i.e. compare the video data for block position 34 in Frame Y with the video data in the position in Frame X indicated by the vector $V_{y33}$) ;
(3) "Same Previous"
 (i.e. compare the video data for block position 34 in Frame Y with the video data in the position in Frame X indicated by the vector $V_{x34}$)
(4) "Top Same" ($V_{y24}$)
(5) "Right Previous" ($V_{x35}$)
(6) "Bottom Previous" ($V_{x44}$)
(7) "Left Previous" ($V_{x33}$)
(8) "Top Previous" ($V_{x24}$)
(9) "Same NW Diagonal" ($V_{y23}$);
(10) "Same NE Diagonal" ($V_{y25}$);
(11) "Previous NE Diagonal" ($V_{x25}$);
(12) "Previous SW Diagonal" ($V_{x43}$);
(13) "Previous NW Diagonal" ($V_{x23}$); and
(14) "Previous SE Diagonal" ($V_{x45}$).

The Applicant has discovered that the above-described prioritization preference of orthogonal block vectors to diagonal block vectors works best. Also, the Applicant has discovered that giving the above-described priority to block vectors in the current block is also preferred.

Of course, if at any point during the application of the above-described prioritized sequence of comparisons a "stop" match is obtained (based on a predetermined matching threshold), then the process is stopped and the corresponding vector is used as an indication of a preferred starting point for a finer search in the close neighborhood thereof. If a stop match is not obtained, then the best (i.e. closest matching) of the above-described vectors is used to determine a preferred starting point for a finer local search for the best available matching block. During this process, if a given vector has already been checked, it is not checked again, but rather is just skipped.

In most cases, the above-described technique produces quick and accurate results. In a "parallel" computing environment (e.g. simultaneous instructions with multiple data), the searching in the respective rows or quadrants will typically continue in all until all are completed, even if one or more reaches an acceptable level of matching much sooner than does the last one. All are typically limited to some maximum time for completion as determined by the system designer.

Once the preferred candidate vector has been determined for an intelligent starting point for the local search, then various finer block-matching searching techniques can be employed. The Applicant recommends two preferred techniques for doing the ensuing fine local search:

(1) "Steepest Descent" searching; and (2) "Table" searching. Both methods work well generally, with their relative efficiencies being somewhat data dependent.

Figures 9, 10:
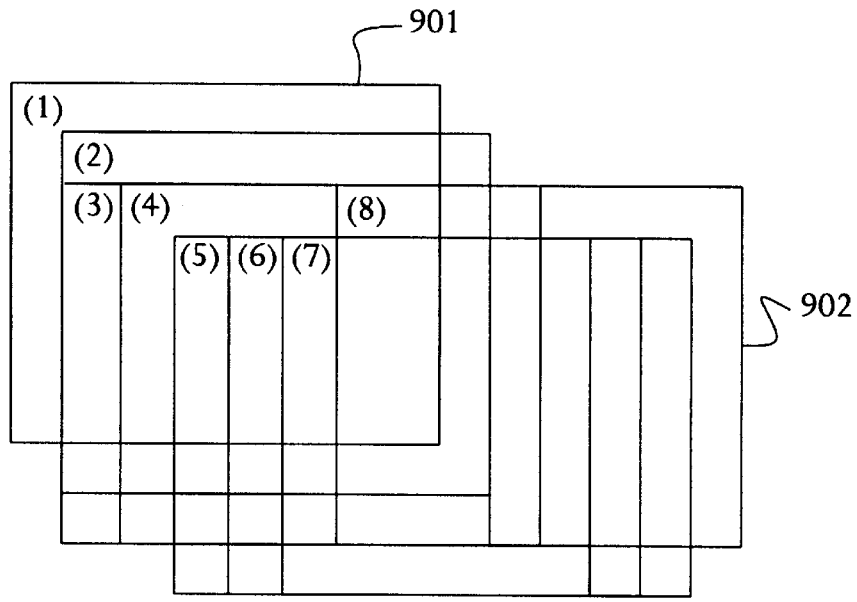
FIG. 9 depicts an example of a typical "steepest descent" search.
FIG. 10 shows a typical pattern for a typical "table" search.

With steepest descent searching, starting at the position defined by the preferred candidate vector, the search block location is shifted one pixel in each of the possible four orthogonal and four diagonal directions and the one of these locations that gives the best match (better than the preferred candidate location) is used as the starting point for the next set of shifts. With the second and ensuing sets of shifts, only seven comparisons are performed because one has already been determined in the previous set of shifts. In this manner the search continues until a local minimum is reached or until a predetermined time limit has been exceeded. The best match thus determined is then used to specify the block vector for that particular block (assuming that the match obtained meets the minimum standard set by the system designer). An example of this technique is depicted in FIG. 9, wherein the successive block positions during the search are indicated by the numerals in parentheses in the upper left-hand corner of each respective block. In this example, the final preferred position (902) is six pixels to the right and two down from the original preferred candidate starting position 901.

Applicant's preferred method of table searching involves moving the search block around the preferred candidate location simply according to a set pattern such as is depicted in FIG. 10. The first try is a shift of one pixel location to the right of the preferred candidate location; the second try is a shift of one pixel location to the left of the preferred candidate location; etc. The search goes on in accordance with the prescribed pattern until a "stop" match is obtained, or until the prescribed time runs out, at which point the best of the "acceptable" matches already calculated is used to determine the final location vector for the current block.

The above-detailed preferred embodiments are examples of Applicant's novel technique but the instant invention is not limited solely thereto. Rather, the invention is defined by the appended claims and their fair equivalents.

What is claimed is:

1. In a motion-estimation digital video image compression system, a computer-implemented method for determining a desirable starting location for a video pixel block-matching search, comprising the steps of:
   (A) identifying existing motion-estimation vectors, in a current picture and in a previously decoded picture, at and near to a block location of a current video target block;
   (B) sequentially comparing the data of said target block with the data of said previously-decoded picture in the respective block locations indicated by a zero vector and by the motion-estimation vectors identified in step (A); and
   (C) choosing the respective block location, corresponding to the best data match obtained in step (B), as the starting location for a continued block-matching search;
   wherein said sequential comparing is performed in locations corresponding first to said zero vector and then to said existing motion-estimation vectors located in the following locations, relative to said current target block location, in the following prioritized sequence:
      (1) one block left, in current picture;
      (2) same position, in immediately-previous picture;
      (3) one block above, in current picture; and
      (4) one block right, in immediately-previous picture.

2. The method of claim 1, wherein the sequential comparing of step (B) is stopped if a predetermined comparison threshold is reached.

3. The method of claim 1, wherein said continued block-matching search comprises a steepest descent search.

4. The method of claim 1, wherein said continued block-matching search comprises a table search.

5. The method of claim 1, wherein said sequential comparing is further performed in locations corresponding to said existing motion-estimation vectors located in the following locations, relative to said current target block location, in the following prioritized sequence:
   (5) one block below, in immediately-previous picture;
   (6) one block left, in immediately-previous picture;
   (7) one block above, in immediately-previous picture;
   (8) one NW diagonal block, in current picture;
   (9) one NE diagonal block, in current picture;
   (10) one NE diagonal block, in immediately-previous picture;
   (11) one SW diagonal block, in immediately-previous picture;
   (12) one NW diagonal block, in immediately-previous picture;
   (13) one SE diagonal block, in immediately-previous picture.

6. In a motion-estimation digital video image compression system, apparatus for determining a desirable starting location for a video pixel block-matching search, comprising:
   (A) means for identifying existing motion-estimation vectors, in a current picture and in a previously decoded picture, at and near to a block location of a current video target block;
   (B) means for sequentially comparing the data of said target block with the data of said previously-decoded picture in the respective block locations indicated by a zero vector and by the motion-estimation vectors identified in step (A); and
   (C) means for choosing the respective block location, corresponding to the best data match obtained in step (B), as the starting location for a continued block-matching search;
   wherein said means for sequentially comparing includes means for comparing in locations corresponding first to said zero vector and then to said existing motion-estimation vectors located in the following locations, relative to said current target block location, in the following prioritized sequence:
      (1) one block left, in current picture;
      (2) same position, in immediately-previous picture;
      (3) one block above, in current picture; and
      (4) one block right, in immediately-previous picture.

7. The apparatus of claim 6, wherein the means for sequentially comparing includes means for stopping if a predetermined comparison threshold is reached.

8. The apparatus of claim 6, wherein said means for choosing comprises means for implementing a steepest descent search.

9. The apparatus of claim 6, wherein said search comprises means for implementing a table search.

10. The apparatus of claim 6, wherein said means for sequential comparing further comprises means for comparing in further locations corresponding to said existing motion-estimation vectors located in the following locations, relative to said current target block location, in the following prioritized sequence:
   (5) one block below, in immediately-previous picture;
   (6) one block left, in immediately-previous picture;
   (7) one block above, in immediately-previous picture;
   (8) one NW diagonal block, in current picture;
   (9) one NE diagonal block, in current picture;
   (10) one NE diagonal block, in immediately-previous picture;
   (11) one SW diagonal block, in immediately-previous picture;
   (12) one NW diagonal block, in immediately-previous picture;
   (13) one SE diagonal block, in immediately-previous picture.

11. A computer-readable medium having stored thereon a plurality of instructions which, when executed by a processor of a video processing system, cause the processor to perform the steps of:
   (A) identifying existing motion-estimation vectors, in a current picture and in a previously decoded picture, at and near to a block location of a current video target block;
   (B) sequentially comparing the data of said target block with the data of said previously-decoded picture in the respective block locations indicated by a zero vector and by the motion-estimation vectors identified in step (A); and
   (C) choosing the respective block location, corresponding to the best data match obtained in step (B), as the starting location for a continued block-matching search;
   wherein said sequential comparing is performed in locations corresponding first to said zero vector and then to said existing motion-estimation vectors located in the following locations, relative to said current target block location, in the following prioritized sequence:
      (1) one block left, in current picture;
      (2) same position, in immediately-previous picture;
      (3) one block above, in current picture; and
      (4) one block right, in immediately-previous picture.

12. The computer-readable medium of claim 11, wherein the sequential comparing of step (B) is stopped if a predetermined comparison threshold is reached.

13. The computer-readable medium of claim 11, wherein said continued block-matching search comprises a steepest descent search.

14. The computer-readable medium of claim 11, wherein said continued block-matching search comprises a table search.

15. The computer-readable medium of claim 11, wherein said sequential comparing is further performed in locations corresponding to said existing motion-estimation vectors located in the following locations, relative to said current target block location, in the following prioritized sequence:
   (5) one block below in immediately-previous picture;
   (6) one block left, in immediately-previous picture;
   (7) one block above, in immediately-previous picture;
   (8) one NW diagonal block, in current picture;
   (9) one NE diagonal block, in current picture;
   (10) one NE diagonal block, in immediately-previous picture;
   (11) one SW diagonal block, in immediately-previous picture;
   (12) one NW diagonal block, in immediately-previous picture;
   (13) one SE diagonal block, in immediately-previous picture.

16. A computer system, comprising:
   a processor; and
   a memory coupled to the processor, wherein the memory stores a routine for determining a desirable starting location for a video pixel block-matching search, wherein:
      (A) existing motion-estimation vectors are identified, in a current picture and in a previously decoded picture, at and near to a block location of a current video target block;
      (B) the data of said target block is sequentially compared with the data of said previously-decoded picture in the respective block locations indicated by a zero vector and by the existing motion-estimation vectors; and
      (C) the respective block location is chosen, corresponding to the best data match obtained in step (B), as the starting location for a continued block-matching search;
   wherein said sequential comparing is performed in locations corresponding first to said zero vector and then to said existing motion-estimation vectors located in the following locations, relative to said current target block location, in the following prioritized sequence:
      (1) one block left, in current picture;
      (2) same position, in immediately-previous picture;
      (3) one block above, in current picture; and
      (4) one block right, in immediately-previous picture.

17. The computer system of claim 16, wherein said sequential comparing is stopped if a predetermined comparison threshold is reached.

18. The computer system of claim 16, wherein said continued block-matching search comprises a steepest descent search.

19. The computer system of claim 16, wherein said continued block-matching search comprises a table search.

20. The computer system of claim 16, wherein said sequential comparing is further performed in locations corresponding to said existing motion-estimation vectors located in the following locations, relative to said current target block location, in the following prioritized sequence:
   (5) one block below, in immediately-previous picture;
   (6) one block left, in immediately-previous picture;
   (7) one block above, in immediately-previous picture;
   (8) one NW diagonal block, in current picture;
   (9) one NE diagonal block, in current picture;
   (10) one NE diagonal block, in immediately-previous picture;
   (11) one SW diagonal block, in immediately-previous picture;
   (12) one NW diagonal block, in immediately-previous picture;
   (13) one SE diagonal block, in immediately-previous picture.

* * * * *